United States Patent
Choi et al.

(10) Patent No.: US 9,628,242 B2
(45) Date of Patent: Apr. 18, 2017

(54) METHOD AND APPARATUS FOR TRANSMITTING A SIGNAL IN A WIRELESS COMMUNICATION SYSTEM

(71) Applicant: LG ELECTRONICS INC., Seoul (KR)

(72) Inventors: Hyeyoung Choi, Anyang-si (KR); Jinmin Kim, Anyang-si (KR); Seunghee Han, Anyang-si (KR); Hyukmin Son, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 14/347,205

(22) PCT Filed: Sep. 24, 2012

(86) PCT No.: PCT/KR2012/007647
§ 371 (c)(1),
(2) Date: Mar. 25, 2014

(87) PCT Pub. No.: WO2013/048070
PCT Pub. Date: Apr. 4, 2013

(65) Prior Publication Data
US 2014/0321422 A1    Oct. 30, 2014

Related U.S. Application Data

(60) Provisional application No. 61/538,953, filed on Sep. 26, 2011, provisional application No. 61/561,937, filed on Nov. 21, 2011.

(51) Int. Cl.
*H04J 11/00*    (2006.01)
*H04W 28/00*    (2009.01)
(Continued)

(52) U.S. Cl.
CPC .......... *H04L 5/0055* (2013.01); *H04L 1/1861* (2013.01); *H04L 5/0005* (2013.01)

(58) Field of Classification Search
CPC ... H04L 5/0055; H04L 5/0005; H04L 5/0094; H04L 1/1809; H04L 5/0073;
(Continued)

(56) References Cited

U.S. PATENT DOCUMENTS

2009/0147743 A1*  6/2009 Parkvall ............ H04W 72/0446
                                                              370/329
2009/0196240 A1*  8/2009 Frederiksen .......... H04L 1/1607
                                                              370/329
(Continued)

FOREIGN PATENT DOCUMENTS

KR    1020100112286 A    10/2010
KR    1020110070768 A     6/2011
KR    1020110097235 A     8/2011

*Primary Examiner* — Alpus H Hsu
*Assistant Examiner* — Camquyen Thai
(74) *Attorney, Agent, or Firm* — Dentons US LLP

(57) ABSTRACT

An embodiment of the present invention relates to a method in which a base station transmits a signal in a wireless communication system, comprising: a step of generating a reception acknowledgement response to the uplink data received from a terminal; and a step of mapping the reception acknowledgement response to a downlink time-frequency resource and transmitting the mapped result. The downlink time-frequency resource is located on a resource region excluding the control region indicated by a physical control format indicator channel, and associated with the index of the resource block with which the uplink data is transmitted.

12 Claims, 19 Drawing Sheets

(51) Int. Cl.
*H04W 72/00* (2009.01)
*H04L 1/04* (2006.01)
*H04L 5/00* (2006.01)
*H04L 1/18* (2006.01)

(58) Field of Classification Search
CPC ........... H04W 72/042; H04W 72/0453; H04W 28/04; H04W 72/04
USPC ........ 370/329, 328, 330, 343, 203; 455/509, 455/450; 714/718
See application file for complete search history.

(56) References Cited

U.S. PATENT DOCUMENTS

2011/0134874 A1* 6/2011 Nakao .................... H04L 5/0094 370/329
2011/0170508 A1 7/2011 Xue et al.
2011/0286426 A1* 11/2011 Kalhan ................ H04L 5/0032 370/330

* cited by examiner

MeNB : macro eNodeB
PeNB : pico eNodeB
FeNB : femto eNodeB

MUE : macro UE
PUE : pico UE
FUE : femto eNodeB

METHOD AND APPARATUS FOR TRANSMITTING A SIGNAL IN A WIRELESS COMMUNICATION SYSTEM

This application is a 35 USC §371 National Stage entry of International Application No. PCT/KR2012/007647, filed Sep. 24, 2012, and claims priority to U.S. Provisional Application No. 61/538,953, filed Sep. 26, 2011 and 61/561,937 filed Nov. 21, 2011, each of which are hereby incorporated by reference in its entirety.

TECHNICAL FIELD

The present invention relates to a method and apparatus for performing resource allocation and signal transmission so as to transmit an Acknowledgement/Negative Acknowledgement (ACK/NACK) response in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method and apparatus for performing resource allocation and signal transmission so as to transmit an acknowledgement/negative acknowledgement (ACK/NACK) response in response to transmission of uplink (UL) data.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting signals by a base station (BS) in a wireless communication system including: generating an Acknowledgement/Negative Acknowledgement (ACK/NACK) response in response to uplink (UL) data received from a user equipment (UE); and mapping the ACK/NACK response to downlink (DL) time-frequency resources, and transmitting the mapped ACK/NACK response, wherein the DL time-frequency resources are located on a resource region other than a control region indicated by a physical control format indicator channel (PCFICH), and are associated with a resource block (RB) index related to transmission of the UL data.

In a second technical aspect of the present invention, a method for receiving signals by a user equipment (UE) in a wireless communication system includes: transmitting uplink (UL) data to a base station (BS); and receiving an Acknowledgement/Negative Acknowledgement (ACK/NACK) response in response to the UL data on downlink (DL) time-frequency resources, wherein the downlink time-frequency resources are located on a resource region other than a control region indicated by a physical control format indicator channel (PCFICH), and are associated with a resource block (RB) index related to transmission of the UL data.

In a third technical aspect of the present invention, a base station (BS) device for use in a wireless communication system includes: a transmission (Tx) module; and a processor, wherein the processor generates an Acknowledgement/Negative Acknowledgement (ACK/NACK) response in response to uplink (UL) data received from a user equipment (UE), and maps the ACK/NACK response to downlink (DL) time-frequency resources and transmits the mapped ACK/NACK response, wherein the DL time-frequency resources are located on a resource region other than a control region indicated by a physical control format indicator channel (PCFICH), and are associated with a resource block (RB) index related to transmission of the UL data.

In a fourth technical aspect of the present invention, a user equipment (UE) device for use in a wireless communication system includes: a reception (Rx) module; and a processor, wherein the processor receives an Acknowledgement/Negative Acknowledgement (ACK/NACK) response in response to the UL data transmitted to a base station (BS) on downlink (DL) time-frequency resources, wherein the downlink time-frequency resources are located on a resource region other than a control region indicated by a physical control format indicator channel (PCFICH), and are associated with a resource block (RB) index related to transmission of the UL data.

The first to fourth technical aspects may include all or some parts of the following items.

The downlink time-frequency resources may be indicated by a resource block (RB) index, and the RB index may be decided by a following equation:

$$n_{PRB}^{e\text{-}PHICH} = n_{PRB}^{PUSCH} \bmod m \qquad \text{[Equation]}$$

where $n_{PRB}^{e\text{-}PHICH}$ is the resource block (RB) index, $n_{PRB}^{PUSCH}$ is the is lowest RB index used for transmission of the UL data, and m is an integer.

m may be any one of the number of resource blocks (RBs) contained in a total downlink bandwidth, and a cell-specific parameter.

If the same RB index is applied to two or more UEs, ACK/NACK responses of the two or more UEs may be generated using different orthogonal sequences. Indexes of the orthogonal sequences may be associated with the RB index used for transmission of the UL data. n indexes of the orthogonal sequences may be decided by a following equation, $$n_{e\text{-}PHICH}^{seq} = \lfloor n_{PRB}^{PUSCH}/m \rfloor \text{ where } n_{e\text{-}PHICH}^{seq} \qquad \text{[Equation]}$$

is an index of the orthogonal sequence, $n_{PRB}^{PUSCH}$ is the lowest RB index of the UL data, and m is either the number of RBs contained in a total DL bandwidth or a cell-specific parameter.

If the same RB index is applied to two or more UEs, Acknowledgement/Negative Acknowledgement (ACK/NACK) responses of the two or more UEs may be generated using different resource elements (REs).

m may be either the number of resource blocks (RBs) allocated for DL data transmission to the user equipment (UE), or a UE-specific parameter.

m is the number of RBs attempted to be decoded for the UE configured to obtain control information.

The downlink time-frequency resources are indicated by a group index, and the group index is decided by a following equation:

$$n_{e\text{-}PHICH}^{group} = n_{PRB}^{PUSCH} \bmod l \qquad \text{[Equation]}$$

where $n_{e\text{-}PHICH}^{group}$ is the group index, $n_{PRB}^{PUSCH}$ is the lowest RB index used for transmission of the UL data, and l is either the number of groups or a UE-specific parameter.

Advantageous Effects

As is apparent from the above description, the embodiments of the present invention can efficiently inform a user equipment (UE) of not only resource allocation for ePHICH but also resources allocated for ePHICH.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Figure 1:
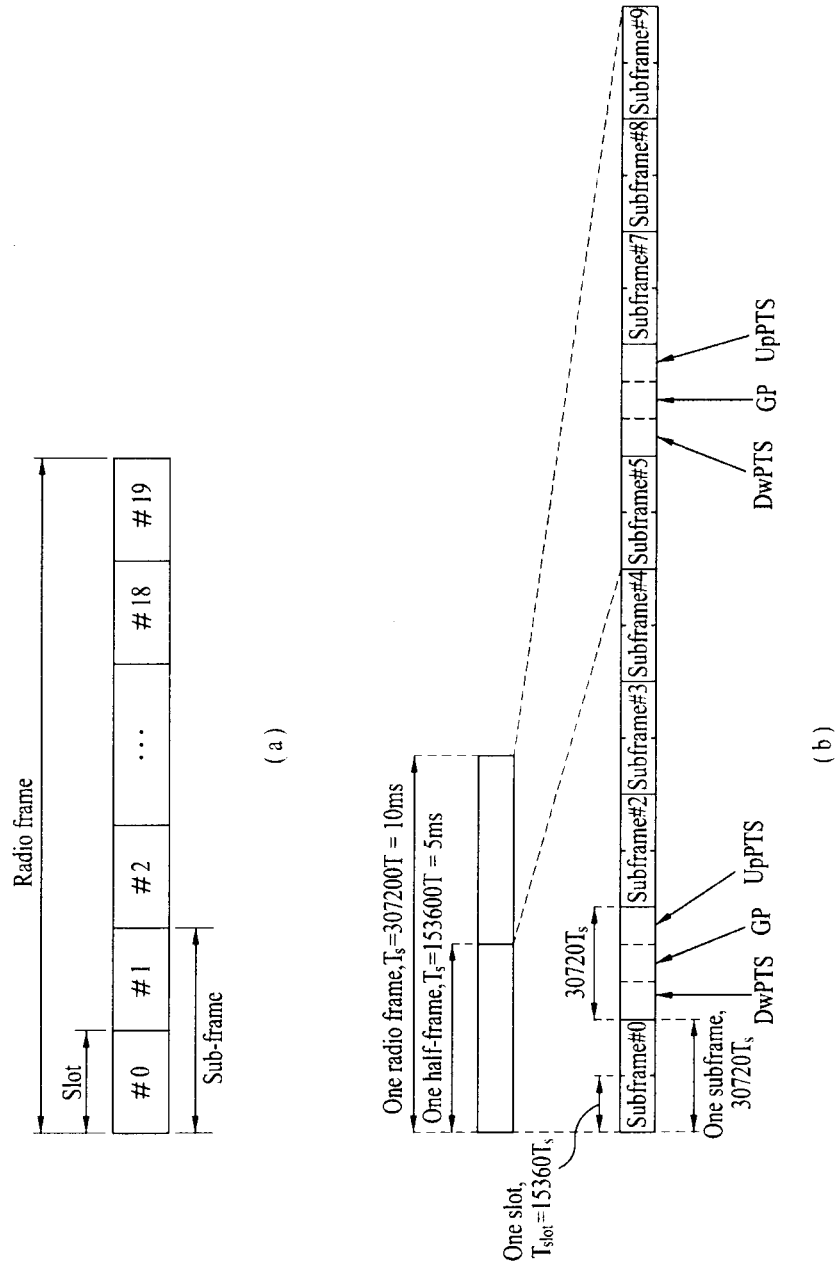
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure for use in the LTE system. Referring to FIG. 1(a), a radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain. Since the LTE system uses OFDMA in downlink, the OFDM symbol indicates one symbol duration. One OFDM symbol may be called an SC-FDMA symbol or a symbol duration. An RB is a resource allocation unit and includes a plurality of contiguous subcarriers in one slot. The structure of the radio frame is only exemplary. Accordingly, the number of subframes included in one radio frame, the number of slots included in one subframe, or the number of OFDM symbols included in one slot may be changed in various manners.

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 2:
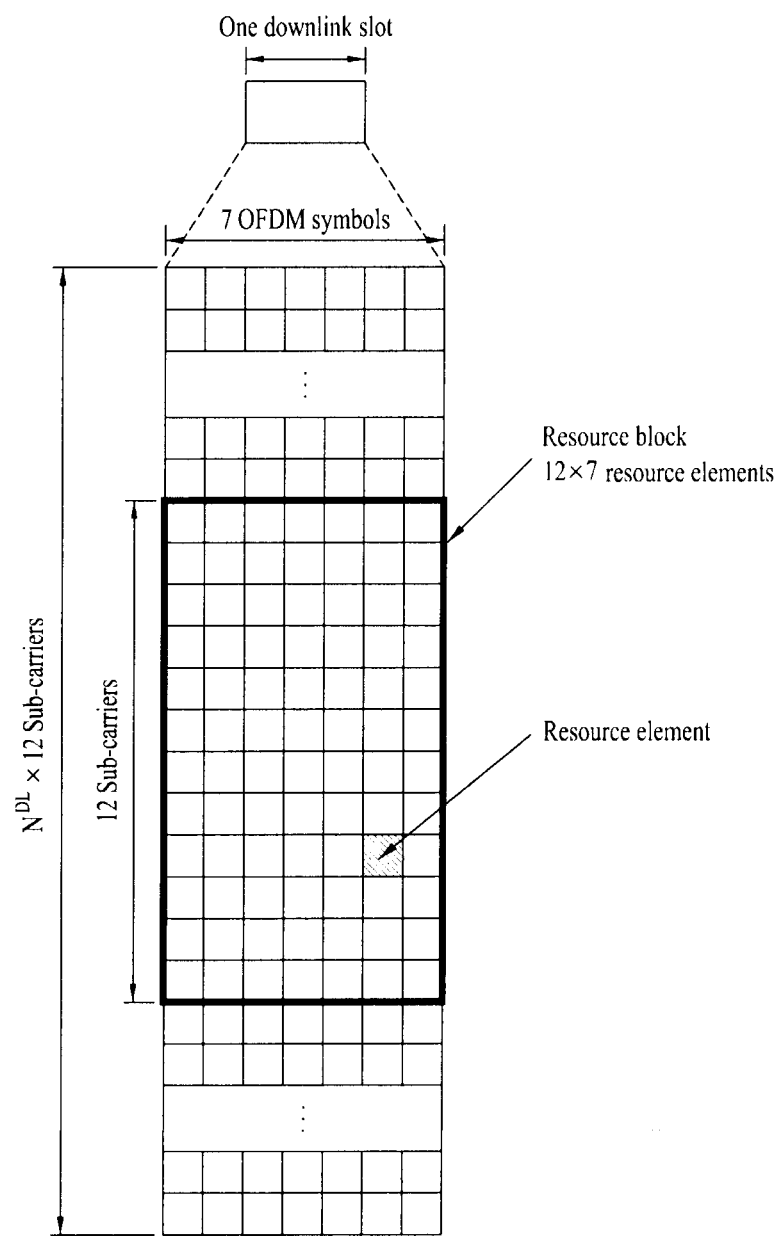
FIG. 2 exemplarily shows a resource grid of one downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
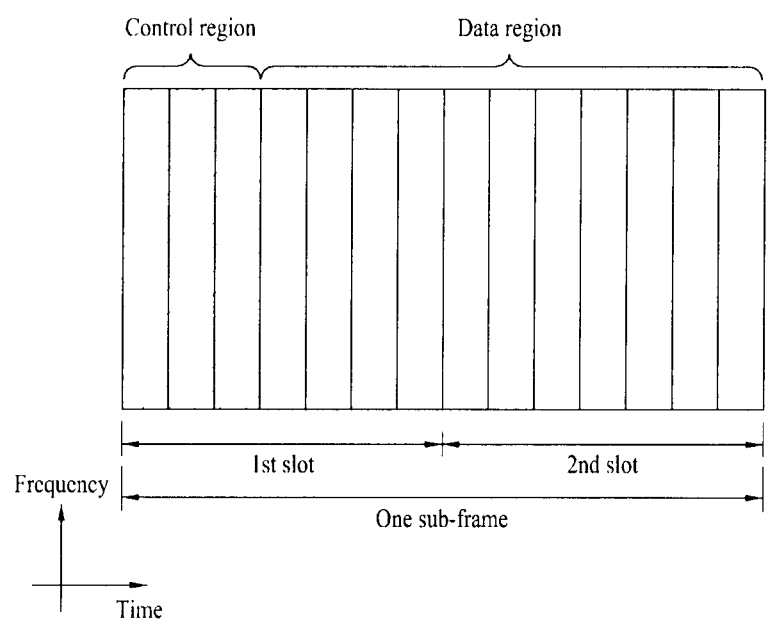
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the LTE system include, for example, a Physical Control Format Indicator Channel (PCFICH), a Physical Downlink Control Channel (PDCCH), a Physical Hybrid automatic repeat request Indicator Channel (PHICH), etc.

PCFICH is transmitted at a first OFDM symbol of a subframe, and includes information about the number of OFDM symbols used to transmit the control channel in the subframe.

PHICH includes a HARQ ACK/NACK signal as a response to uplink transmission.

PDCCH transmits downlink control information (DCI). DCI may include uplink or downlink scheduling information or an uplink transmit power control command for an arbitrary UE group according to format.

DCI Format

DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier offset is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

PDCCH Processing

When DCI is transmitted on a PDCCH, a cyclic redundancy check (CRC) is added to the DCI. The CRC is masked by a radio network temporary identifier (RNTI). Here, different RNTIs may be used according to transmission purpose of the DCI. Specifically, P-RNTI may be used for a paging message relating to network initiated connection establishment, RA-RNTI may be used in a case relating to random access, and SI-RNTI may be used in a case relating to a symbol information block (SIB). In the case of unicast transmission, C-RNTI serving as a unique UE identifier may be used. The DCI with the CRC added thereto is coded into a predetermined code, and then adjusted to correspond to the quantity of resources used for transmission through rate-matching.

In PDCCH transmission, control channel elements (CCEs) serving as contiguous logical allocation units are used to map a PDCCH to REs for efficient processing. A CCE includes 36 REs corresponding to 9 resource element groups (REGs). The number of CCEs necessary for a specific PDCCH depends on a DCI payload corresponding to a control information size, a cell bandwidth, a channel coding rate, etc. Specifically, the number of CCEs for a specific PDCCH can be defined according to PDCCH format, as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As shown in Table 1, the number of CCEs depends on the PDCCH format. For example, a transmitter can adaptively use PDCCH formats in such a manner that it uses PDCCH format 0 and changes PDCCH format 0 to PDCCH format 2 when a channel status becomes poor.

Blind Decoding

While one of the above-mentioned PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 2.

TABLE 2

| | Search space | | The number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 2, the UE has a plurality of search spaces at each aggregation level because 4 aggregation levels are present.

The search spaces may be divided into a UE-specific search space and a common search space, as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

Figure 4:
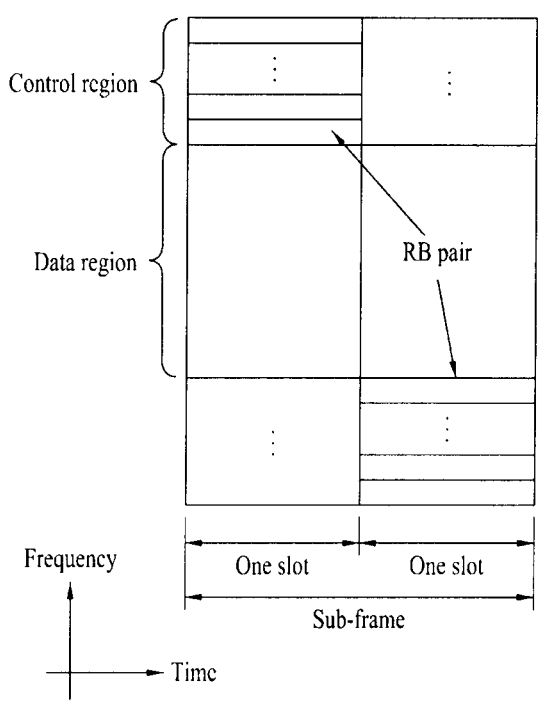
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Physical Hybrid-ARQ Indicator Channel (PHICH)

Figure 5:
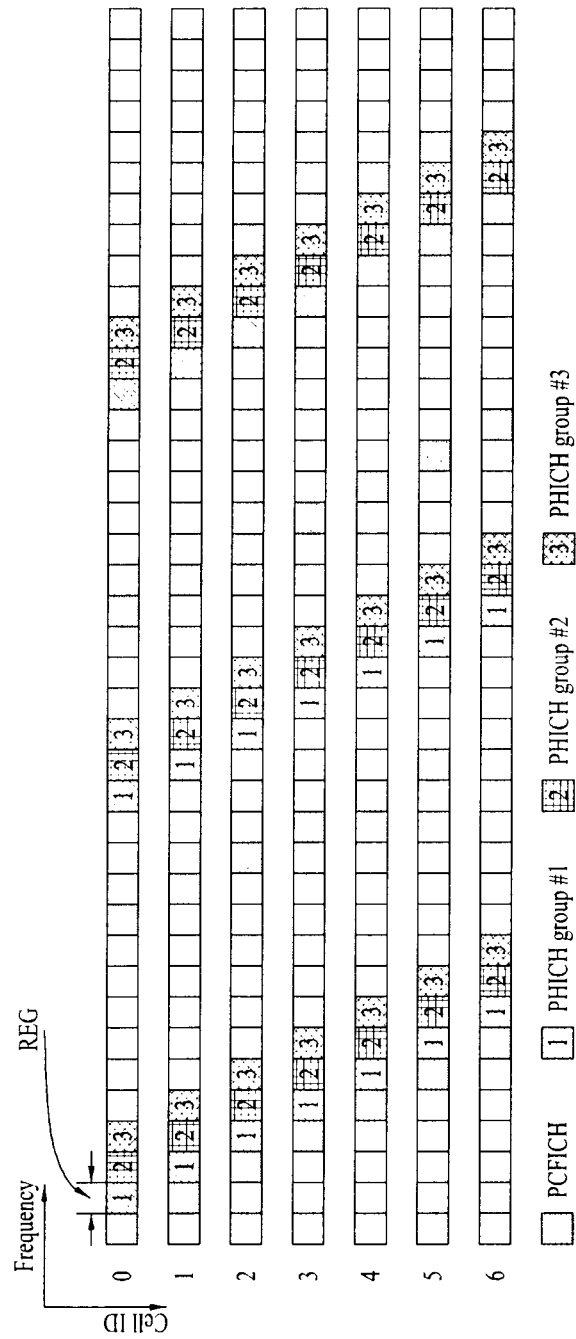
FIG. 5 shows the positions of a PCFICH and a Physical hybrid ARQ indicator Channel (PHICH) which are generally applied to a specific bandwidth.

FIG. 5 shows the positions of PCFICH and PHICH generally applied to a specific bandwidth. ACK/NACK information for uplink data transmission is transmitted over a PHICH. A plurality of PHICH groups is constructed in a single subframe, and a plurality of PHICHs may be present in a single PHICH group. Therefore, PHICH channels for multiple UEs are contained in a single PHICH group.

Referring to FIG. 5, allocating a PHICH to each UE of a plurality of PHICH groups is achieved not only using a lowest physical resource block (PRB) index of a PUSCH resource allocation but also a cyclic shift (CS) index for a demodulation RS (DMRS) transmitted on a UL grant PDCCH. DMRS is an uplink reference signal, and is provided along with UL transmission so as to perform channel estimation for demodulating UL data. In addition, a PHICH resource is signaled as an index pair such as ($n_{PHICH}^{group}$, $n_{PHICH}^{seq}$). In the index pair ($n_{PHICH}^{group}$, $n_{PHICH}^{seq}$), $n_{PHICH}^{group}$ denotes a PHICH group number and $n_{PHICH}^{seq}$ denotes an orthogonal sequence index in the corresponding PHICH group. $n_{PHICH}^{group}$ and $n_{PHICH}^{seq}$ are defined as shown in the following equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$ [Equation 1]

In Equation 1, $n_{DMRS}$ denotes a cyclic shift of a DMRS used for uplink transmission related to a PHICH, and is mapped to a value of 'cycle shift for DMRS' field of the latest UL grant control information (e.g., DCI format 0 or 4) for a transport block (TB) associated with the corresponding PUSCH transmission. For example, the 'cyclic shift for DMRS' field of the latest UL grant DCI format may be 3 bits long. If the 'cyclic shift for DMRS' field is set to "000", $n_{DMRS}$ may be set to zero '0'.

In Equation 1, $N_{SF}^{PHICH}$ denotes the size of a spreading factor used for PHICH modulation. $I_{PRB\_RA}^{lowest\_index}$ is the lowest PRB index of a first slot of the corresponding PUSCH transmission. $I_{PHICH}$ is set to the value of 1 only when the TDD system is in a special case (if UL/DL configuration is set to zero '0' and PUSCH transmission is achieved at subframe n=4 or n=9, and $I_{PHICH}$ is set to zero '0' in the remaining cases other than the special case. $N_{PHICH}^{group}$ denotes the number of PHICH groups configured by a higher layer. $N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

In Equation 2, $N_g$ denotes information regarding the amount of PHICH resources transmitted on a physical broadcast channel (PBCH), and $N_g$ is 2 bits long and is denoted by $N_g \in \{1/6, 1/2, 1, 2\}$. In Equation 2, $N_{RB}^{DL}$ denotes the number of resource blocks (RBs) configured in downlink.

In addition, examples of orthogonal sequences defined in the legacy 3GPP LTE Release 8/9 are shown in the following table 3.

TABLE 3

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 6:
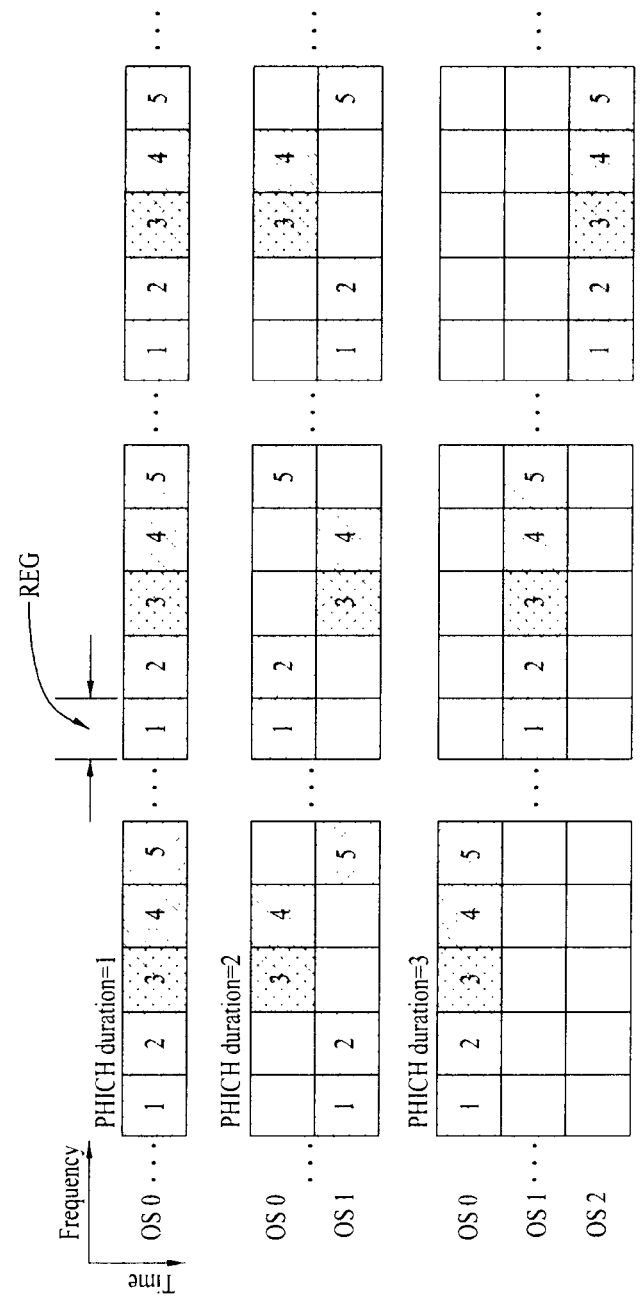
FIG. 6 shows a downlink resource element (RE) position mapped to a PHICH group.

FIG. 6 shows a downlink resource element position mapped to a PHICH group. A PHICH group may be constructed in different time domains (i.e., different OFDM Symbols (OSs)) of a single subframe shown in FIG. 9 according to PHICH duration.

Carrier Aggregation (CA)

Figure 7:
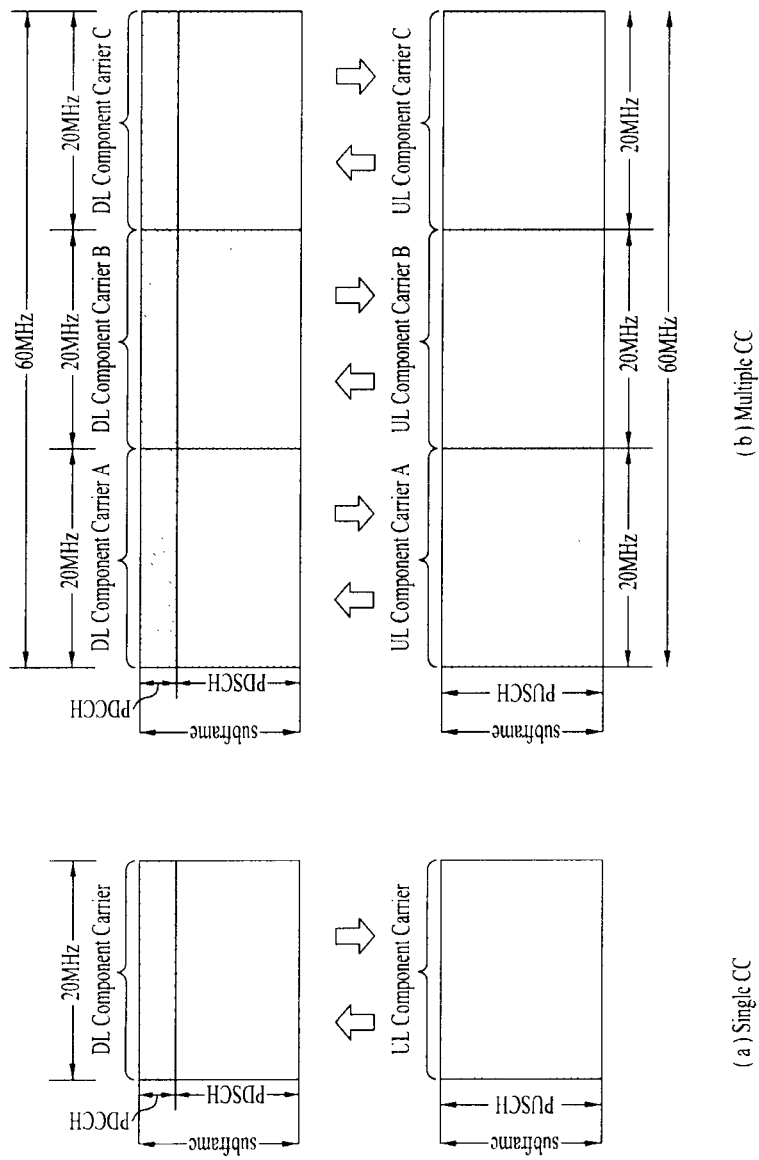
FIG. 7 is a conceptual diagram illustrating carrier aggregation (CA).

FIG. 7 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A DL CC and a UL CC may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 7. CA is a technology introduced to use a wider band to meet demands for a high transmission rate. CA can be defined as aggregation of two or more component carriers (CCs) having different carrier frequencies. FIG. 7(a) shows a subframe when a conventional LTE system uses a single CC and FIG. 7(b) shows a subframe when CA is used. In FIG. 7(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 8:
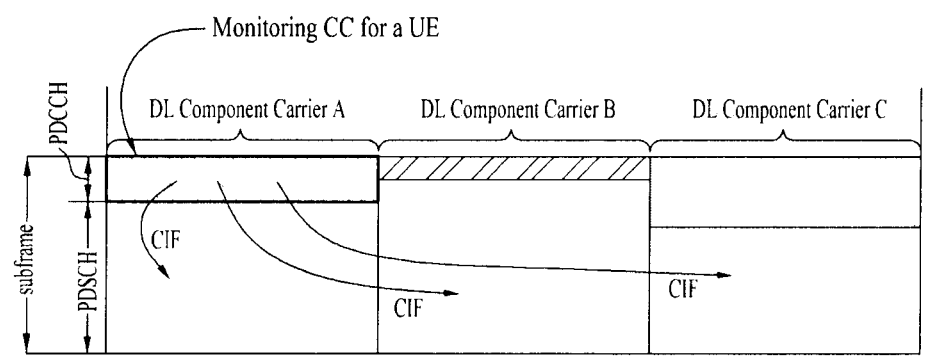
FIG. 8 is a conceptual diagram illustrating cross carrier scheduling.

FIG. 8 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 8, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 8, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above-mentioned ACK/NACK bundling or multiplexing when the number of ACK/NACK bits to be transmitted is greater than the number of ACK/NACK bits that can be supported by ACK/NACK bundling or multiplexing.

ACK/NACK Multiplexing Method

In case of ACK/NACK multiplexing, contents of the ACK/NACK signal in response to multiple data units can be identified by one combination of an ACK/NACK unit used for actual ACK/NACK transmission and any one of QPSK-modulated symbols. For example, it is assumed that one ACK/NACK unit carries information of 2 bits and receives a maximum of 2 data units. In this case, it is assumed that HARQ ACK/NACK for each received data unit is represented by one ACK/NACK bit. In this case, a transmitter for transmitting data can identify the ACK/NACK result as shown in the following Table 4.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) (where i=0, 1) indicates the ACK/NACK result of the data unit (i). As described above, since it is assumed that a maximum of two data units (Data Unit 0 and Data Unit 1) are received, Table 4 includes HARQ-ACK(0) as the ACK/NACK result of Data Unit 0, and includes HARQ-ACK(1) as the ACK/NACK result of Data Unit 1. In Table 4, Discontinuous Transmission (DTX) may indicate that a data unit corresponding to HARQ-ACK (i) is not transmitted or may indicate that the receiver does not detect the presence of the data unit corresponding to HARQ-ACK(i). In addition, $n_{PUCCH,x}^{(1)}$ is an ACK/NACK unit used for actual ACK/NACK transmission. If a maximum of two ACK/NACK units is present, the two ACK/NACK units may be represented by $n_{PUCCH,0}^{(1)}$ and $n_{PUCCH,1}^{(1)}$, respectively. In addition, b(0),b(1) is two bits transmitted by the selected ACK/NACK unit. A modulation symbol transmitted through the ACK/NACK unit is determined by the bits b(0),b(1).

For example, if the receiver has successfully received and decoded two data units (i.e., refer to the case of 'ACK, ACK' of Table 4), the receiver transmits two bits (1,1) using the ACK/NACK unit $n_{PUCCH,1}^{(1)}$. Alternatively, under the condition that the receiver receives two data units, if the first data unit (i.e., Data Unit 0 corresponding to HARQ-ACK (0)) fails in decoding and the second data unit (i.e., Data Unit 1 corresponding to HARQ-ACK(1)) succeeds in decoding (i.e., refer to the case 'NACK/ACK, ACK' of Table 4), the receiver transmits two bits (0,0) using the ACK/NACK unit $n_{PUCCH,1}^{(1)}$.

As described above, selection of the ACK/NACK unit (i.e., selection of $n_{PUCCH,0}^{(1)}$ or $n_{PUCCH,1}^{(1)}$ in Table 4) and a combination (i.e., a combination of b(0),b(1)) of actual bit contents of the transmitted ACK/NACK unit are mapped or linked to the actual ACK/NACK contents, such that ACK/NACK information of several data units can be transmitted using one ACK/NACK unit. The above-mentioned ACK/NACK principle is extended without change, such that ACK/NACK of two or more data units can be easily multiplexed.

In the ACK/NACK multiplexing scheme, if at least one ACK basically exists in all data units, NACK and DTX may not be distinguished from each other (that is, as can be seen from NACK/DTX of Table 4, NACK and DTX may be coupled to each other), because it is impossible for only a combination of the ACK/NACK unit and the QPSK-modulated symbol to reflect all ACK/NACK states (i.e., ACK/NACK hypotheses) generable when a user desires to distinctively represent NACK and DTX. On the other hand, if ACK is not present in all data units (that is, if only NACK or DTX is present in all data units), one definite NACK case in which only one HARQ-ACK(i) value is definitely set to NACK (that is distinguished from DTX) can be defined. In this case, the ACK/NACK unit corresponding to a data unit of one definite NACK may be reserved to transmit several ACK/NACK signals.

Semi-Persistent Scheduling (SPS)

DL/UL SPS (semi-persistent scheduling) RRC(Radio Resource Control) signaling informs the UE of information as to which subframe is to be used for SPS transmission/reception (using a subframe period and offset), and activation and release of the actual SPS are performed through PDCCH. That is, although the UE receives SPS through RRC signaling, it does not immediately SPS Tx/Rx, and performs the SPS operation after receiving a PDCCH (i.e., PDCCH where SPS C-RNTI is detected) indicating activation (or reactivation). That is, if SPS activation PDCCH is received, frequency resources caused by allocation of an RB indicated by the received PDCCH are allocated, the modulation and coding rate based on MCS information is applied, such that Tx/Rx operations can be carried out using a subframe period and offset assigned through RRC signaling. On the other hand, upon receiving a PDCCH indicating SPS release, the UE stops the Tx/Rx operation. Although the UE stops the Tx/Rx operation, if the UE receives a PDCCH indicating activation (or reactivation), the UE can restart the Tx/Rx operation using the subframe period and offset assigned by RRC signaling in response to RB assignment indicated by the received PDCCH, MCS, etc.

In the case of PDCCH formats prescribed in 3GPP LTE, DCI format 0 is defined for uplink, and various formats (DCI format 1, 1A, 1B, 1C, 1D, 2, 2A, 3, 3A, etc.) are defined for downlink. A variety of control information, [for example, hopping flag, RB allocation, Modulation Coding Scheme (MCS), Redundancy Version (RV), New Data Indicator (NDI), Transmit Power Control (TPC), cyclic shift DM RS (demodulation reference signal), UL index, Channel Quality Information (CQI) request, DL assignment index, HARQ process number, TPMI (transmitted precoding matrix indicator), Precoding Matrix Indicator (PMI) confirmation, etc.] may be transmitted as an eclectically selected combination according to individual usages.

More specifically, if PDCCH is used for SPS scheduling activation/release, CRC of a DCI transmitted over a PDCCH can be masked to SPS C-RNTI. In this case, the setting result of NDI=0 can be validated. In the case of SPS activation, a combination of bit fields is set to zero (0) as shown in the following Table 5, such that the set result can be used as a virtual CRC.

TABLE 5

| | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: MSB is set to '00' |

If an error incapable of being checked by CRC has occurred, the virtual CRC is adapted to determine whether the corresponding bit field value is a promised value, such that it can provide additional error detection capability. Although an error occurs in a DCI assigned to another UE, provided that this UE does not detect the corresponding error and mistakes the error for its own SPS activation, the UE continuously uses the corresponding resources, such that one error may cause the persistent problem. Therefore, the virtual CRC can prevent the SPS from being wrongly detected.

In the case of SPS release, bit field values are established as shown in the following Table 6, such that the established values may be used as virtual CRCs.

TABLE 6

| | DCI format 0 | DCI format 1A |
|---|---|---|
| TPC command for scheduled PUSCH | set to '00' | N/A |

TABLE 6-continued

| | DCI format 0 | DCI format 1A |
|---|---|---|
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1's |

Heterogeneous Deployment

Figure 9:
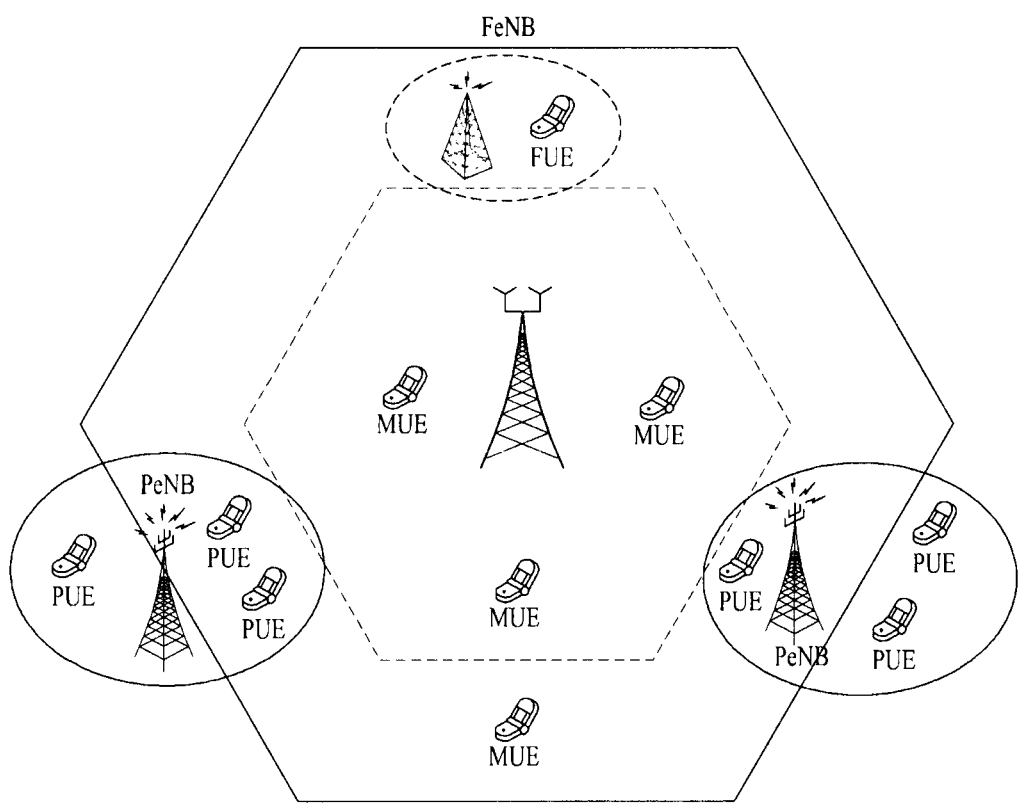
FIG. 9 is a conceptual diagram illustrating a heterogeneous network.

FIG. 9 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to hand over to the CSG eNB.

Inter-Cell Interference Coordination (ICIC)

As described above, in the above-mentioned heterogeneous network environment (heterogeneous deployment) or CoMP environment, inter-cell interference (ICI) may occur. In order to solve the inter-cell interference (ICI) problem, inter-cell interference coordination (ICIC) may be used. The conventional ICIC may be applied to frequency resources or time resources.

As exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP LTE Release-8 system. A variety of parameters may be contained in an ICIC message for frequency resources. For example, a Relative Narrowband Transmission Power (RNTP) related to downlink transmission power, uplink (UL) Interference Overhead Indication (IOI) related to uplink interference, UL High Interference Indication (HII), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even under high interference are scheduled in another frequency sub-region in which an HII is set to a first value (for example, 1), one cell having received the ICIC message can avoid interference from another cell having transmitted the ICIC message.

On the other hand, as an exemplary ICIC of the time resource, the 3GPP LTE-A system (or 3GPP LTE Release- 10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of silencing, a specific cell may allow a specific subframe to be an Almost Blank Subframe (ABS). The ABS may be classified into two ABSs (i.e., ABS in normal subframe and ABS in MBSFN subframe) as shown in FIG. 6. In more detail, as shown in FIG. 6(a), the ABS in a normal subframe indicates that a data region remains empty whereas a Cell specific Reference Signal (CRS) is transmitted, and the ABS in MBSFN subframe indicates that no CRS is transmitted. In the case of 'ABS in normal subframe', there may arise some influence of interference caused by CRS. Accordingly, although the ABS in MBSFN subframe has advantageous over the ABS in normal subframe in terms of interference, the number of usages of the ABS in MBSFN subframe is limited, such that two kinds of ABSs can be independently or collectively used as necessary.

Figure 10:
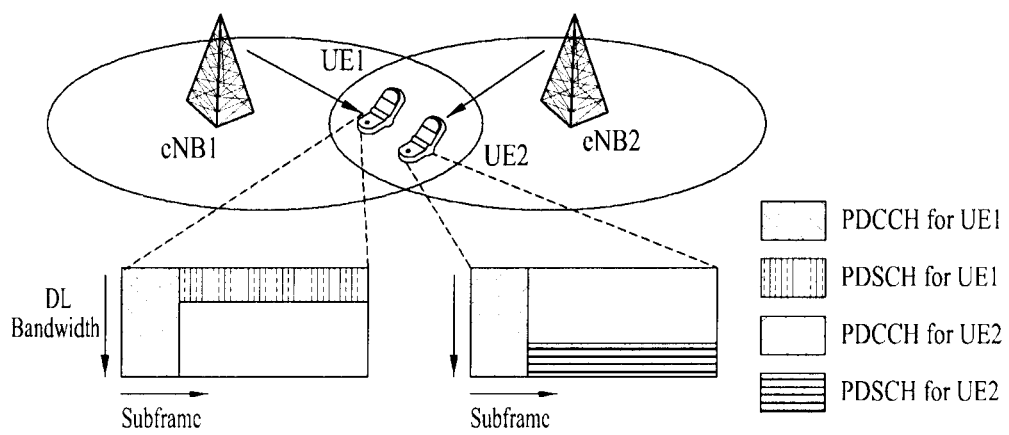
FIGS. 10 and 11 are conceptual diagrams illustrating a method for mitigating interference through scheduling in a heterogeneous network.

FIG. 10 illustrates a scheme of mitigating (or alleviating) interference by allocating PDSCHs to UEs located at the edges of cells in orthogonal frequency regions, which can be used to exchange scheduling information between eNBs. However, a PDCCH is transmitted over the entire downlink bandwidth, as described above, and thus interference due to the PDCCH cannot be mitigated. For example, since a time-frequency region in which a PDCCH is transmitted from eNB1 to UE1 and a time-frequency region in which a PDCCH is transmitted from eNB2 to UE2 overlap, PDCCH transmission for UE1 and PDCCH transmission for UE2 interfere with each other.

Figure 11:
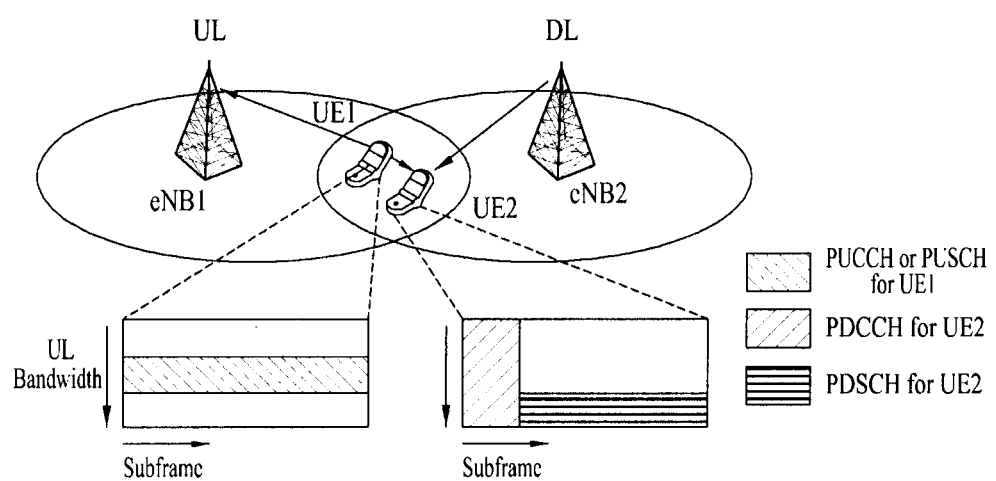

Referring to FIG. 11, a PUCCH or a PUSCH transmitted from UE1 may interfere with a PDCCH or a PDSCH received by UE2 adjacent to UE1. Here, if scheduling information is exchanged between eNB1 and eNB2, interference in the PDSCH can be avoided by allocating the UEs to orthogonal frequency regions. However, the PDCCH is affected by the PUCCH or PUSCH transmitted from UE1.

For this reason, introduction of an ePDCCH different from the PDCCH is discussed. The ePDCCH is introduced to effectively support CoMP (coordinated multipoint transmission), MU-MIMO (multiuser-multiple input multiple output) as well as to mitigate (or alleviate) interference.

Even when the ePDCCH is introduced, it is impossible to avoid interference applied to a PHICH on which ACK/NACK information for a PUSCH is transmitted. This interference may cause PUSCH retransmission to deteriorate system performance. Furthermore, when the quantity of resources transmitted on the PHICH increases, PDCCH capacity decreases, and thus PDCCH blocking probability increases. Therefore, it is possible to solve the interference problem and PHICH capacity problem caused when PHICH (i.e., ePHICH) is transmitted in a data region (i.e., a resource region other than a control region indicated by PCFICH) instead of a legacy control region. In case of using ePHICH, a method for allocating a time-frequency resource region to which ePHICH is transmitted will hereinafter be described in detail.

Embodiment 1

A time-frequency resource region to which ePHICH is allocated may be determined in association with an RB index to which UL data is transmitted. In more detail, if the UE transmits UL data over a PUSCH at an RB allocated through a UL grant or the like, the eNB or BS generates ACK/NACK in response to the UL data. In association with the generated ACK/NACK, the BS (or eNB) can transmit ePHICH at an RB having the same RB index as the lowest index of an RB where PUSCH is transmitted. In this case, the RB index is used as a physical RB (PRB) index, and may be any one of a first slot and a second slot of the RB pair used for PUSCH transmission.

The above-mentioned content can be represented by the following equation 3.

$$n_{PRB}^{e\text{-}PHICH} = n_{PRB}^{PUSCH} \bmod m \qquad \text{[Equation 3]}$$

In Equation 3, $n_{PRB}^{e\text{-}PHICH}$ is an RB index allocated to ePHICH, $n_{PRB}^{PUSCH}$ is the lowest value from among RB indexes used for PUSCH transmission, and m is the number of RBs (or a cell-specific parameter) contained in a total downlink bandwidth.

Figure 12:
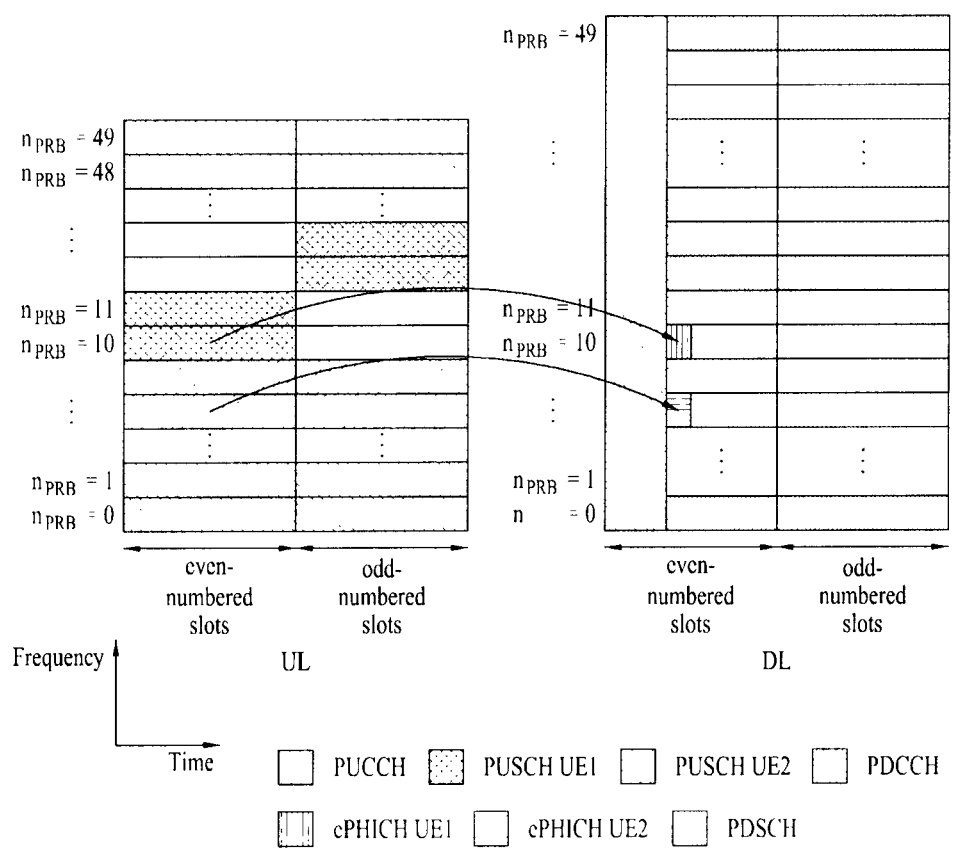
FIGS. 12 to 18 are conceptual diagrams illustrating resource allocation for ePHICH according to various embodiments.

Referring to FIG. 12, UE1 may transmit PUSCH at RB indexes 10 and 11 ($n_{PRB}$=10, 11). The BS may determine an RB index to which ePHICH is allocated to be the lowest index ($n_{PRB}$=10) of an RB used for PUSCH transmission, and may transmit ePHICH on the resources. Likewise, UE2 transmits PUSCH at RB indexes 8 and 9 ($n_{PRB}$=8, 9), such that the BS (or eNB) can transmit ePHICH at the same RB index as a PUSCH RB index.

As can be seen from FIG. 12, it is assumed that a DL bandwidth is larger than a UL bandwidth, and the RB for ePHICH decided by the above description is not always allocated to the UE. Although FIG. 12 shows that ePHICH is transmitted on the lowest OFDM symbol of a data region of the aforementioned RB for convenience of description, the scope or spirit of the present invention is not limited thereto, and a detailed position of the RB may be changed. The BS (or eNB) can perform ePHICH transmission at a subframe located after the $k_{PHICH}$-th subframe (in case of TDD) using a resource region allocated as described above, or can perform ePHICH transmission at a subframe located after the fourth subframe (in case of FDD). If the BS (or eNB) does not correctly receive a PUSCH from UE1, i.e., if NACK occurs, the BS (or eNB) may retransmit the PUSCH at a predefined subframe.

Embodiment 2

Figure 13:
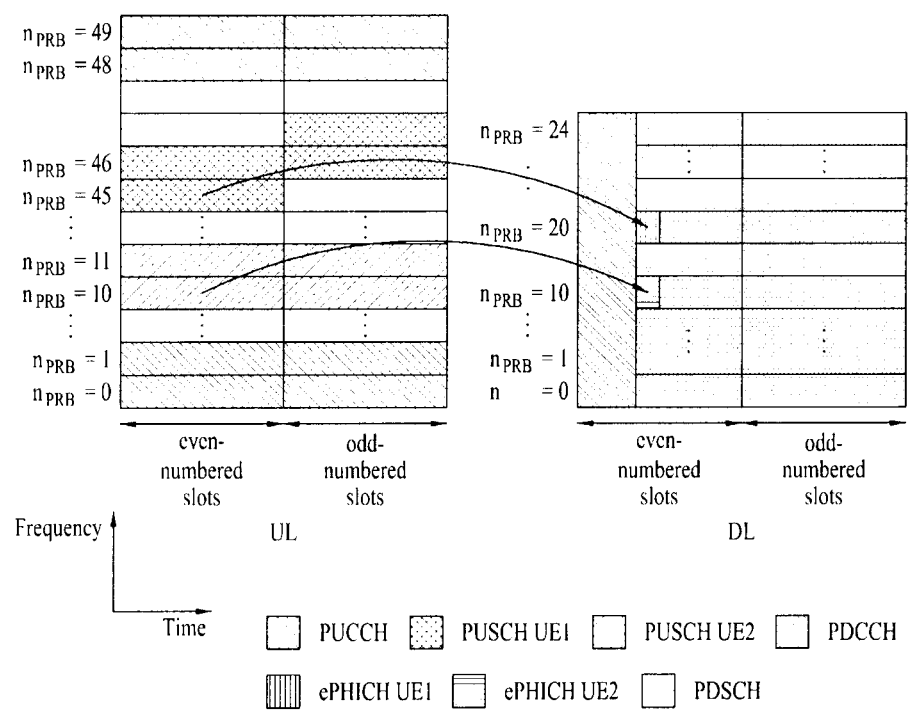
Figure 14:
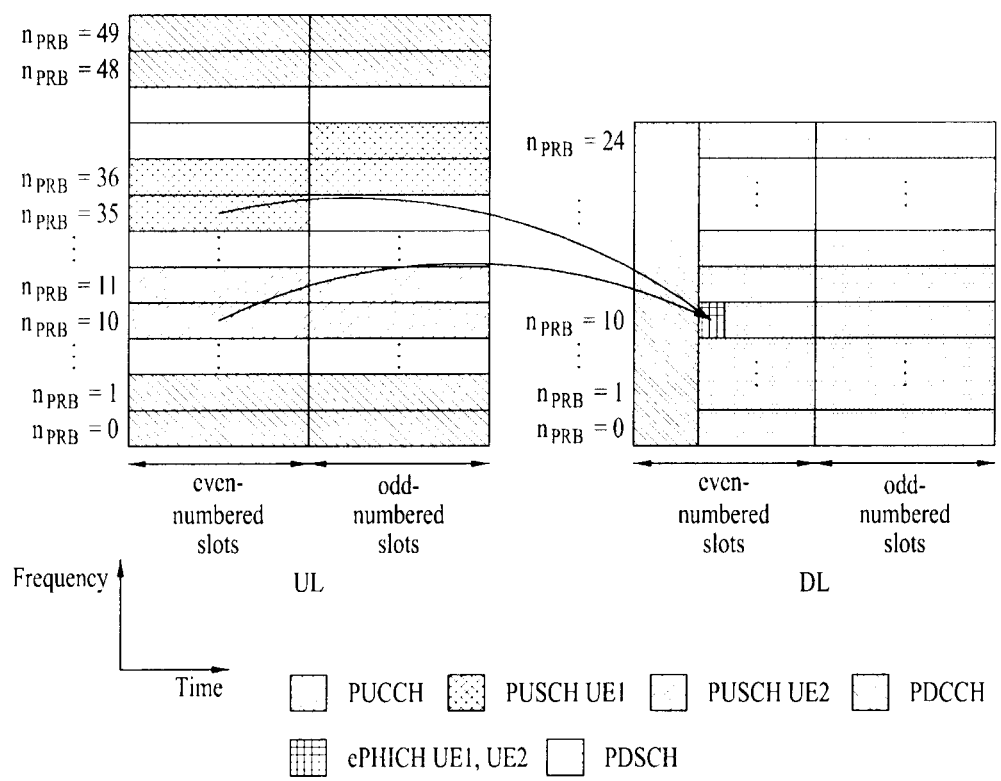

Embodiment 2 relates to ePHICH resource allocation when a DL bandwidth is less than a UL bandwidth as shown in FIG. 13. Detailed ePHICH resource allocation is identical to that of Embodiment 1. Accordingly, ePHICH resources can be allocated using Equation 3 shown in Embodiment 1. Referring to FIG. 13 and Equation 13, if UE1 transmits a PUSCH at RB indexes 10 and 11 ($n_{PRB}$=10, 11), an RB index for ePHICH is determined to be '10' as shown in Equation 3, and UE2 transmits a PUSCH at RB indexes 45 and 46 ($n_{PRB}$=45, 46), such that the RB index for ePHICH is determined to be '20'. However, as shown in FIG. 13, a total number of RBs of a total DL bandwidth shown in FIG. 13 is 25, such that it can be recognized that the number of RBs is less than 50 indicating the number of RBs of a total UL bandwidth. In this case, RBs for ePHICH of two UEs configured to use specific RBs for PUSCH transmission may overlap with each other. In more detail, as shown in FIG. 14, it can be recognized that RB of an index 10 for ePHICH for UE1 overlaps with an RB for ePHICH of UE2 configured to transmit a PUSCH using the RB index 35. To solve this problem, UE1 and UE2 may use different orthogonal sequences, or may use different resources within the same RB.

First, a method for using different orthogonal sequences in association with a UE will hereinafter be described. Similarly with Equation 3 for deciding the aforementioned RB for ePHICH, orthogonal sequences may also be associated with the RB index through which PUSCH is transmitted. In more detail, the orthogonal sequence indicated by the orthogonal sequence index shown in Table 3 can be applied to ePHICH generation. The orthogonal sequence index may be decided by the following equation 4.

$$n_{e\text{-}PHICH}^{seq} = \lfloor n_{PRB}^{PUSCH}/m \rfloor \qquad \text{[Equation 4]}$$

In Equation 4, $n_{e\text{-}PHICH}^{seq}$ is an index of the orthogonal sequence, $n_{PRB}^{PUSCH}$ is the lowest value from among RB indexes used for PUSCH transmission, and m is the number of RBs (or a cell-specific parameter) contained in a total DL bandwidth.

If Equation 4 is applied to Equation 14, UE1 generates an orthogonal sequence corresponding to 'Index=0', and UE2 generates ePHICH using an orthogonal sequence corresponding to 'Index=1'.

Figure 15:
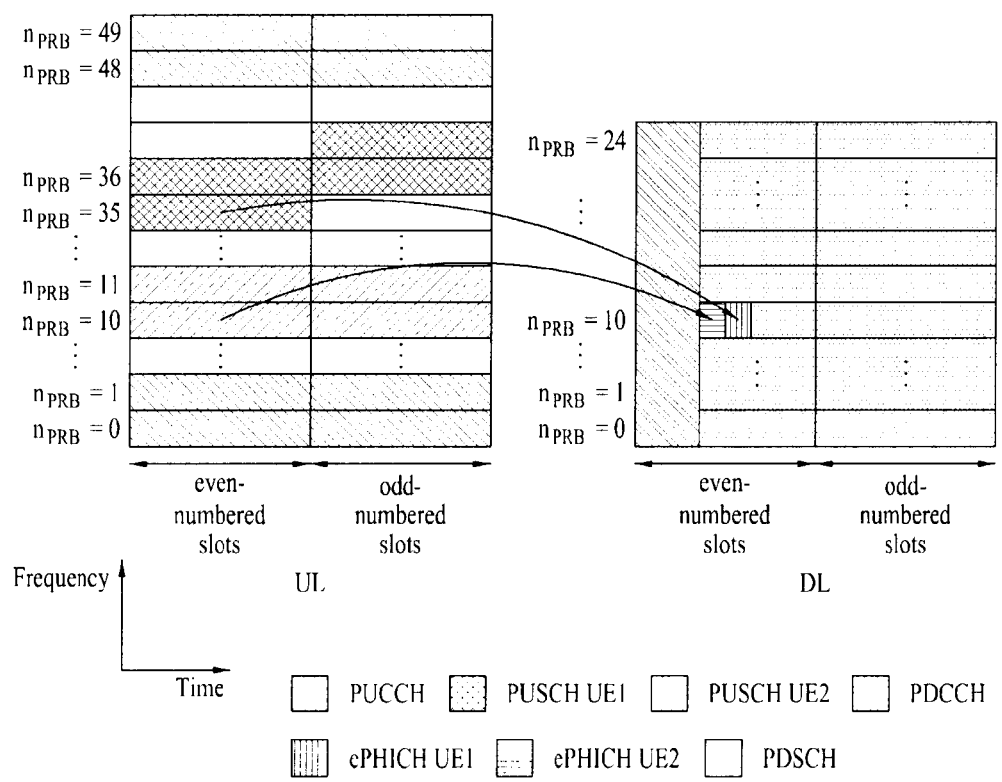

Alternatively, for two or more UEs having the same RB indexes for ePHICH, using different resources may be configured as shown in FIG. 15. Although two UEs (UE1 and UE2) shown in FIG. 15 are configured to use different contiguous resources on a time axis at the RB of 'Index=10', the scope or spirit of the present invention is not limited thereto, and various cases in which different resources are used on time and/or frequency domain(s) may be considered.

On the other hand, according to Embodiment 1 and Embodiment 2, RBs for ePHICH may be selected at an arbitrary position from among a total DL frequency band. In other words, RB for ePHICH may belong to a PDSCH region allocated to the corresponding UE, or may not belong to the PDSCH region. If the RB for ePHICH is not contained in the PDSCH region allocated to the corresponding UE, the UE has to use non-coherent detection. The UE must use non-coherent detection when the UE attempting to detect ePHICH at other RBs instead of the RB allocated to the UE is unable to estimate a channel status using a reference signal (RS) (i.e., a cell-specific RS, a demodulation reference signal (DMRS), etc.)

Embodiment 3

Figure 16:
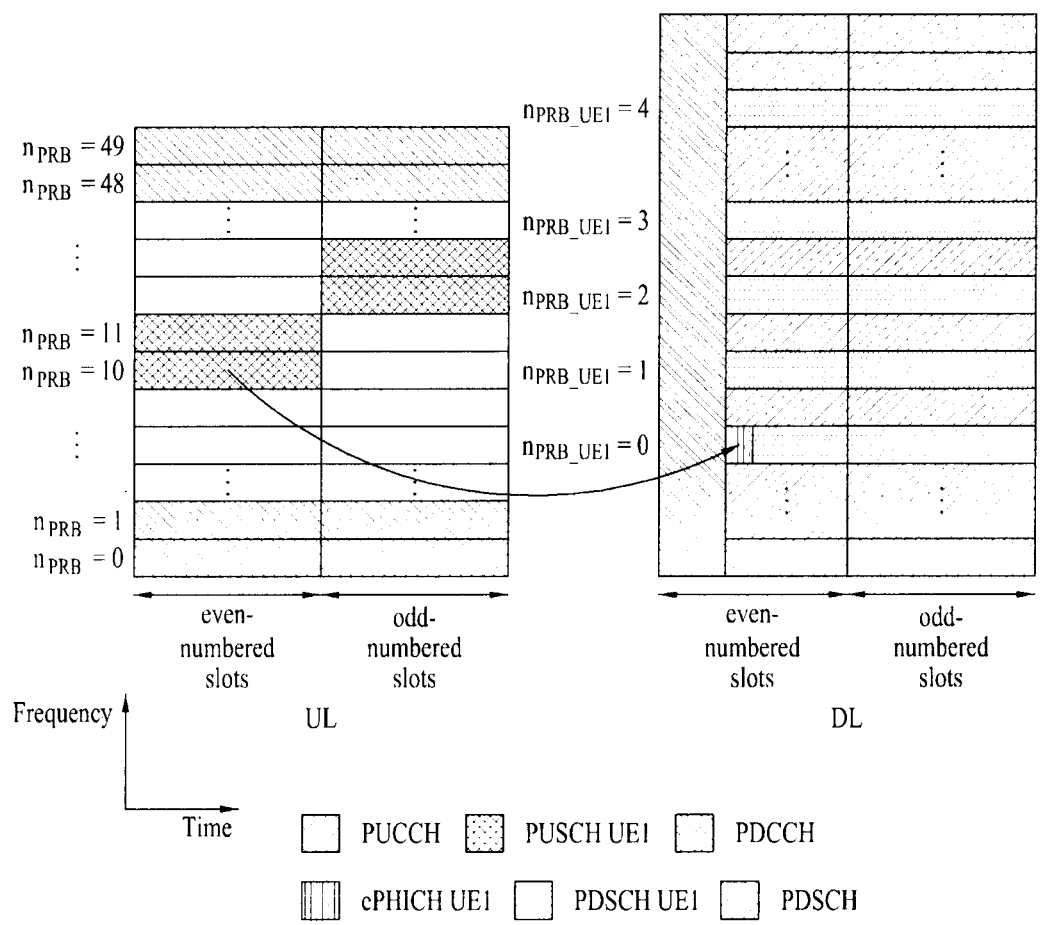

Embodiment 3 relates to a method for allocating an RB for ePHICH in a similar way to that of Equation 3, and the RB for ePHICH is allocated to the corresponding UE. Referring to FIG. 16, a UE configured to transmit a PUSCH using the RB indexes 10 and 11 decides the RB index for ePHICH using Equation 3, and may be modified into the number of RBs (or a UE-specific parameter) allocated to transmit DL data to the UE such that the modified can be applied. Accordingly, the number of RBs allocated for DL data transmission for UE1 of FIG. 16 is set to 5, of Equation 3 is denoted by m=5, and UE1 is assigned the RB index '0' for ePHICH according to Equation 3. In this case, the RB index is newly indexed for the RB of PDSCH allocated for UE1.

Figure 17:
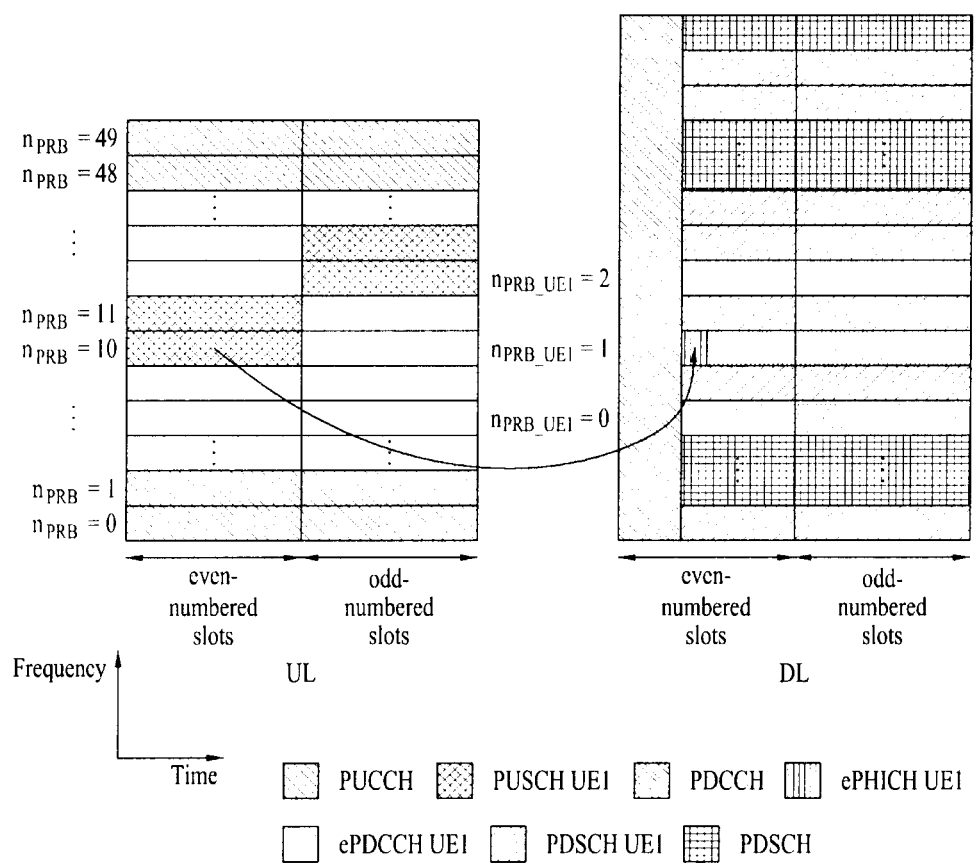

Alternatively, as shown in FIG. 17, an RB corresponding to ePDCCH allocated to a UE may be used as necessary. The BS may inform an ePDCCH-configured UE of either a candidate ePDCCH region or ePDCCH region to which ePDCCH can be transmitted, using RRC signaling or DCI of the legacy PDCCH region. As a result, the UE can recognize the number of RBs and the position of RBs which are used for transmission of ePDCCH allocated to the UE. After these RBs are indexed again, the RB index for ePHICH can be recognized using Equation 3. In this case, m may be the number of RBs of an ePDCCH (or a candidate ePDCCH) region allocated to the UE. In fact, ePHICH may be located at a CSS or USS region of ePDCCH at the corresponding RB.

On the other hand, the method of Embodiment 3 may use coherent detection differently from Embodiment 1 and Embodiment 2 because ePHICH is transmitted on RBs corresponding to PDSCH or ePDCCH allocated to the corresponding UE.

Embodiment 4

Figure 18:
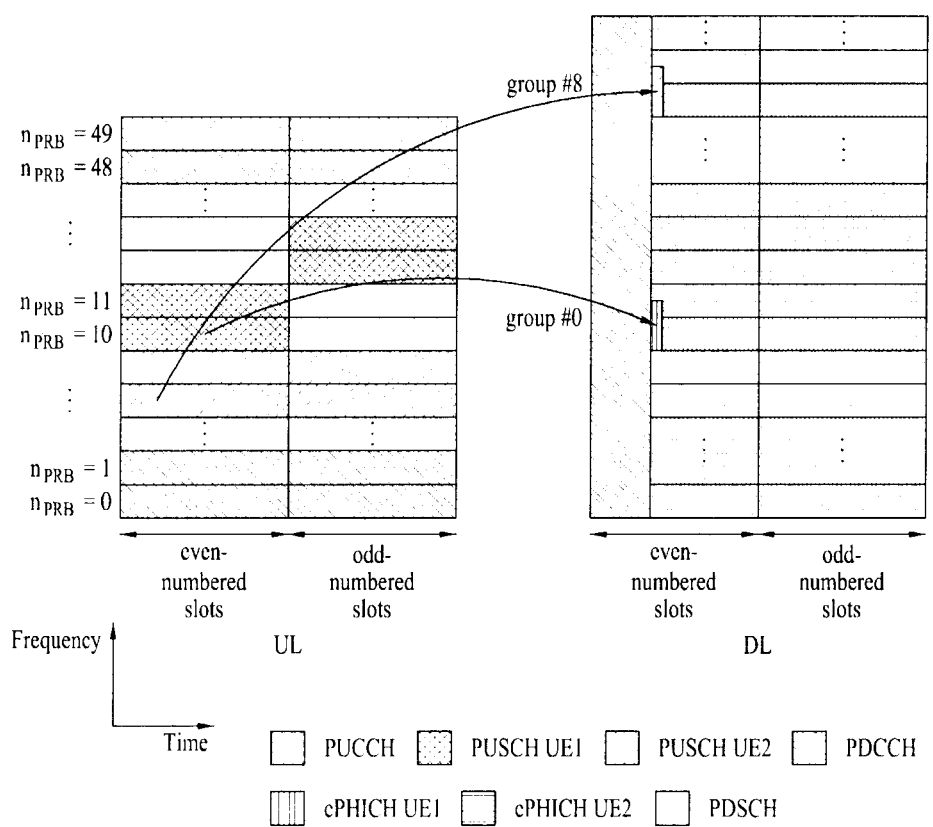

FIG. 18 is a conceptual diagram illustrating a method for allocating time-frequency resources not limited to the RB unit during ePHICH transmission. In this case, a plurality of UEs may be grouped so that ePHICH can be transmitted on the basis of the grouped UEs. Referring to FIG. 18, UE1 may transmit a PUSCH using RBs of Indexes 10 and 11, and UE2 may transmit a PUSCH using RBs of Indexes 8 and 9. In this case, the group index may be represented by the following equation 5.

$$n_{e\text{-}PHICH}^{group} = n_{PRB}^{PUSCH} \bmod l \qquad \text{[Equation 5]}$$

In Equation 5, $n_{e\text{-}PHICH}^{group}$ is a group index, $n_{PRB}^{PUSCH}$ is the lowest RB index from among RB indexes used for PUSCH transmission, and l is the number of groups (or a UE-specific parameter). Accordingly, UE1 of FIG. 18 can receive ePHICH on time-frequency resources corresponding to Group #0, and UE2 of FIG. 18 can receive ePHICH on time-frequency resources corresponding to Group #8 (where, it is assumed that the number of groups is set to 10). In other words, the BS (or eNB) can transmit ePHICH on time-frequency resources corresponding to a group identical to a group index obtained through Equation 5 from among ePHICH groups in an overall DL bandwidth.

Embodiments 1 to 4 relate to a method for allowing the BS (or eNB) to allocate ePHICH resources and a method for implicitly informing a UE of ePHICH transmission resources, because the UE recognizes the RB index used for PUSCH transmission and an RB index allocated by the BS for ePHICH is associated with an RB index used for PUSCH transmission. Various methods for explicitly informing the BS (or eNB) of resources allocated for ePHICH will hereinafter be described in detail.

The BS (or eNB) may directly inform the UE of ePHICH resource indexes indicating an ePHICH transmission region through RRC signaling or new DCI format, etc. For example, the BS (or eNB) may inform the UE of ePHICH transmission resources (RB index or group index, etc.) through RRC signaling or the like. If the UE transmits a PUSCH using UL SU-MIMO (Single User-Multiple Input Multiple Output), two ePHICH resource indexes can be transmitted through RRC signaling. Alternatively, the ePHICH resource index for a first PUSCH Transmission Block (TB) is transmitted through RRC signaling, and the ePHICH resource index for a second PUSCH TB can be transmitted using the resource index transmitted for a first PUSCH (for example, ePHICH resource index+1 of the first TB).

If ePHICH is transmitted on the ePDCCH region, the BS (or eNB) may inform the UE of a candidate ePHICH region through RRC signaling or DCI. If ePDCCH is allocated to the UE, the candidate ePHICH region may indicate an ePDCCH region allocated to the UE or a specific region in which ePDCCH can be transmitted to the UE, or may indicate a PDSCH region other than the PDCCH region. Alternatively, the BS (or eNB) may transmit not ePHICH region but a black list indicating a specific region to which no ePHICH is transmitted to the UE.

ePHICH resources may be notified through a candidate ePHICH resource index set. In this case, the candidate ePHICH resource index set may be configured using RRC signaling or a predefined method. The BS may inform the UE of the candidate ePHICH resource index set using a bitmap. For example, if a total number of candidate ePHICH resource index sets is set to 25, the set contained in the candidate ePHICH region from among a bitmap of 25 bits may be indicated by '1'. If the UE transmits a PUSCH using two TBs, the candidate ePHICH resource index set may be enlarged two times as compared to the case in which the UE transmits a PUSCH using only one TB. For example, for a UE configured to transmit a PUSCH using only one TB, if n (e.g., n=3) sets/groups are allocated as the ePHICH resource index set, and 2n (e.g., 2n=6) sets/groups can be allocated as the ePHICH resource index set for the UE configured to transmit a PUSCH using two TBs. In this case, the ePHICH resource index set of individual TBs may be successively allocated. For example, if 3 sets/groups are configured as the candidate ePHICH resource index set, indexes (n~n+2) can be signaled as the candidate ePHICH resource index set for a first TB for the UE configured to use UL SU-MIMO. In this case, the candidate ePHICH resource index set for a second TB may also be signaled through RRC, or indexes (n+3~n+5) may be used through the predefined method (for example, the lowest ePHICH resource index set+3 for a first TB). The candidate ePHICH resource index set may be configured in CSS or USS of PDCCH or ePDCCH. If the candidate ePHICH resources are successively allocated, this may indicate the start resource index or the end resource index. Instead of the candidate ePHICH resource index sets, the resource index set to be actually used from among the candidate ePHICH resource index sets may also be indicated through RRC signaling, DCI or the like. In this case, the resource index set to be actually used may be UE-specifically, UE-group-specifically, or cell-specifically indicated.

The ePHICH resource index for each TB may also be indicated using two resource indexes.

Alternatively, a first ePHICH resource index for one TB may be indicated, and a second ePHICH resource index for the remaining TBs may also be acquired from the first ePHICH resource. For the UE configured to use UL SU-MIMO, the ePHICH resource index for PUSCH transmitted at a first TB may be indicated using one resource index. The ePHICH transmission region for PUSCH transmitted at a second TB can be found using the resource index of the first TB.

For example, if the ePHICH resource index of the first TB in the candidate ePHICH resource index set is denoted by n_phich, the resource index for a second TB may be decided to be 'n_phich+1'. If a transmission mode is changed to 1 TB transmission according to DCI format 0 or a single antenna port scheme indication or the like, ePHICH for the second TB is no longer required, and resources of the second TB are preserved, so that other UEs are prevented from using the resources of the second TB and ePHICH resources for other UEs can be allocated.

Detailed examples of the above-mentioned methods will hereinafter be described in detail.

In accordance with a first example, the candidate ePHICH resource index set is configured through RRC signaling using n (e.g., n=4) RBs (or n groups), the resource index set to be actually used can be indicated through the m-bit (e.g., e=2) resource indicator. In other words, if n=4 and m=2 are given, the candidate ePHICH index set is denoted by {a,b,c,d} (where each of (a, b, c, d) may have the range (0~total number of downlink RBs–1). If the resource indicator is denoted by '10', 'c' may be determined to be the above ePHICH resource index set. In this case, the orthogonal sequence sets can be simultaneously determined on the basis of the resource indicator. That is, since the resource indicator is denoted by '10', the orthogonal sequence index '2' may be used. Alternatively, the orthogonal sequence index may be indicated using a separate additional indicator.

In accordance with a second example, if the resource indicator of the first TB is denoted by '10' from among (00, 01, 10, 11), 'c' from among the ePHICH index set {a,b,c,d} configured through RRC signaling may be determined to be the ePHICH resource index set. The resource index set for the second TB may be determined to be 'c+1'. Alternatively, 'd' located subsequent to the resource index 'c' indicated by the resource indicator may be used as the ePHICH resource index set for the second TB.

In accordance with a third example, n (e.g., n=4) candidate ePHICH resource index sets (k) (e.g., k=2) may be configured through RRC signaling. Through the m-bit resource indicator (e.g., m=2), the resource index to be actually used in each set is indicated. If n=4, k=2, and m=2 are given, the index sets are denoted by {a, b, c, d} and {e, f, g, h}. If the resource indicator is set to '10' from among (00, 01, 10, 11), 'c' and 'g' may be determined to be the above ePHICH resource indexes for ePHICH transmission. That is, multiple ePHICH resource indexes can be decided from one resource indicator. If the multiple ePHICH resource indexes are transmitted using two TBs, the above-mentioned method may be used. In this case, the orthogonal sequence indexes can be simultaneously determined on the basis of the above resource indicator. In other words, since the resource indicator is denoted by '10', the orthogonal sequence index '2' can be used. Alternatively, the orthogonal sequence index may be indicated using a separate additional indicator.

In accordance with a fourth embodiment, (n*m) (e.g., n=4, m=2) candidate ePHICH resource index sets constructing k pairs (e.g., k=2) can be indicated through the m-bit resource indicator (e.g., m=2) such that the paired resource index to be actually used in the above set can be indicated. If n=4, k=2, and m=2 are given, the RRC-configured index sets are denoted by {a, b, c, d, e, f, g, h}. If the resource indicator is denoted by '10' from among (00, 01, 10, or 11), 'e, f' may be determined to be the above ePHICH resource indexes for ePHICH transmission. That is, 'e, f' can be determined using multiple ePHICH resource indexes on the basis of one resource indicator. If data is transmitted using two TBs on PUSCH, the above-mentioned method may be used. In this case, the orthogonal sequence indexes can be simultaneously determined on the basis of the resource indicator. That is, since the resource indicator is denoted by '10', the orthogonal sequence index '2' may be used. Alternatively, the orthogonal sequence index may be indicated using a separate additional indicator.

In accordance with a fifth example, the UE may substantially recognize the RB index used for ePHICH transmission through the following equation within the candidate ePHICH region.

ePHICH transmission RBs (or groups) index=(UL PRB index for PUSCH transmission) mod (a total number of PRBs (or groups) of the ePHICH candidate region (a total number of UE-specific parameters, cell-specific parameters, downlink PRBs))

The above-mentioned method for constructing the resource indicator may reuse a specific field of DCI or may configure a new DCI format. If a specific field is reused, a TPC field, a DAI field, a Cyclic shift for DM RS and OCC index field, a CSI request field, and an SRS request field from among the DCI format may be used. The TPC field may be reused as ARI under a specific condition. For example, the corresponding field may be reused as a resource indicator only in a PDCCH or a PDCCH indicating UL SPS release corresponding to PUSCH transmitted in a primary cell. The DAI field is not used in case of FDD, the DAI field may be used as a resource indicator. Alternatively, the DL DAI field may be reused as a resource indicator.

A new DCI format for the resource indicator may be defined. In more detail, a field may be added to the DCI format for the resource indicator purposes. For example, 2 bits may be added to DCI format.

The DCI format including the above-mentioned resource indicator may be transmitted through the conventional PDCCH or ePDCCH. In this case, the DCI format can be transmitted through CSS and/or USS.

If ePHICH transmitted on resources indicated by the above resource indicator is denoted by NACK, the UE has to retransmit a PUSCH. In this case, the resource indicator can be used as follows. In a first example, if adaptive retransmission used for UL grant transmission is decided, the above-mentioned resource indicator may indicate ePHICH resources. In a second example, in the case of retransmission without UL grant, a previous resource indicator or the resource indicator for an initial UL grant used for transmission of the same transmission may be used without change. In a third example, if SPS is activated, including the resource indicator in the UL grant may be configured through RRC signaling or another DCI format.

On the other hand, according to the above-mentioned description, if ePHICH resources are located in a PDCCH/ePDCCH region, the following description can be applied according to whether the CSS region is contained in a PDCCH region or an e-PDCCH region. If the CSS region is defined in the PDCCH region, the legacy PHICH may be used without change. Alternatively, PHICH resources may be indicated using the ePDCCH resource indicator. If ePDCCH is used, the corresponding resources may be allocated to a PHICH using the lowest RB index used for ePDCCH transmission, the CCE index or the resource index newly defined for ePDCCH transmission. In this case, scheduling coordination with an old UE may be additionally needed. If the CSS region is defined in the ePDCCH region, the above-mentioned resource indicator may be used.

If the same resources are allocated to ePHICH, a method for identifying the resources may be used using the orthogonal sequence. In contrast, after ePHICH is mapped to the layer and is the multiplexed, the BS may inform the UE of specific information related to layer mapping through RRC signaling, new DCI format, etc.

Figure 19:
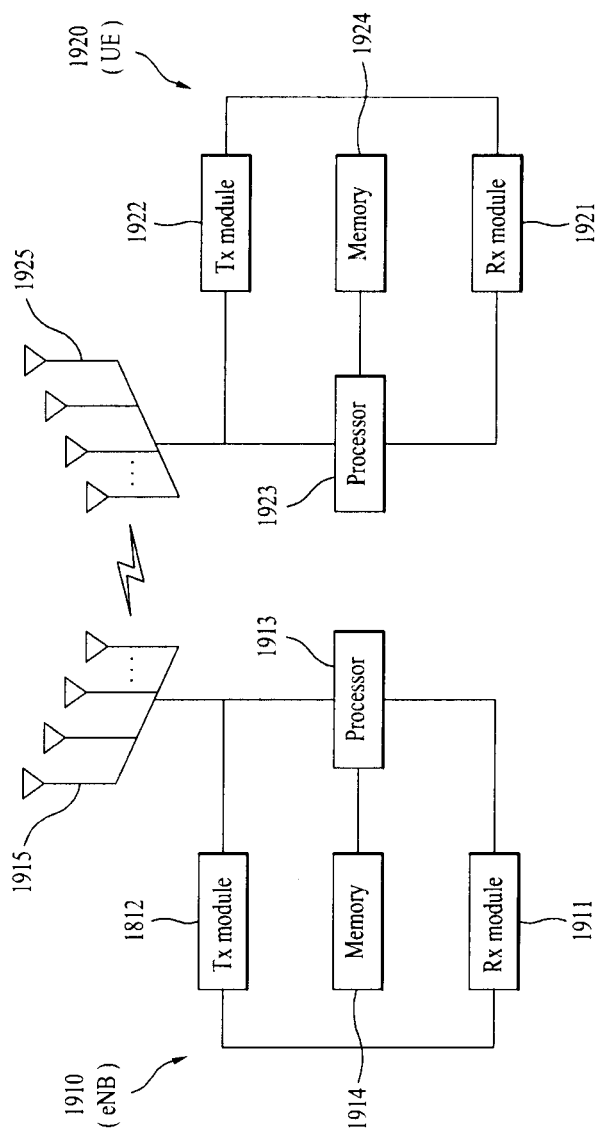
FIG. 19 is a block diagram illustrating a BS (or eNB) device and a UE device according to the embodiments.

FIG. 19 is a block diagram illustrating a BS (eNB) device and a UE device according to the embodiments of the present invention.

Referring to FIG. 19, the BS device 1910 according to the present invention may include a reception (Rx) module 1911, a transmission (Tx) module 1912, a processor 1913, a memory 1914, and a plurality of antennas 1915. The plurality of antennas 1915 indicates the BS device for supporting MIMO transmission and reception. The reception (Rx) module 1911 may receive a variety of signals, data and information on an uplink starting from the UE. The Tx module 1912 may transmit a variety of signals, data and information on a downlink for the UE. The processor 1913 may provide overall control to the BS device 1910.

The processor 1913 of the BS device 1910 according to the embodiments may be configured to implement the embodiments of the present invention.

The processor 1913 of the BS device 1910 processes information received at the BS device 1910 and transmission information to be transmitted externally. The memory 1914 may store the processed information for a predetermined time. The memory 1914 may be replaced with a component such as a buffer (not shown).

Referring to FIG. 19, the UE device 1920 according to the present invention may include a reception (Rx) module 1921, a transmission (Tx) module 1922, a processor 1923, a memory 1919, and a plurality of antennas 1925. The plurality of antennas 1925 indicates the UE device for supporting MIMO transmission and reception. The reception (Rx) module 1921 may receive a variety of signals, data and information on a downlink starting from the BS. The Tx module 1922 may transmit a variety of signals, data and information on an uplink for the BS. The processor 1923 may provide overall control to the UE device 1920.

The processor 1923 of the UE device 1920 according to the embodiments may be configured to implement the embodiments of the present invention.

The processor 1923 of the UE device 1920 processes information received at the UE device 1920 and transmission information to be transmitted externally. The memory 1919 may store the processed information for a predetermined time. The memory 1919 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1910 shown in FIG. 19 may be applied to the eNB (BS), or may also be applied to a relay node (RN) acting as a DL transmission entity or UL reception entity without departing from the scope or spirit of the present invention. In addition, the description of the UE device 1920 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the embodiments of the present invention have been disclosed on the basis of the 3GPP LTE mobile communication system, the embodiments can be equally or equivalently applied to various wireless communication systems.

The invention claimed is:
1. A method for transmitting signals by a base station (BS) in a wireless communication system, comprising:
generating an Acknowledgement/Negative Acknowledgement (ACK/NACK) response in response to uplink (UL) data received from a user equipment (UE); and
mapping the ACK/NACK response to downlink (DL) resources, and transmitting the mapped ACK/NACK response,
wherein a time domain location of the DL resources is in a data region, which is a resource region, other than a control region indicated by a physical control format indicator channel (PCFICH), and
wherein a frequency domain location of the DL resources is determined in consideration of at least one UL resource block (RB) used for receiving the UL data
wherein a frequency domain location of the DL resources is represented by an index of a DL resource block (RB), and the index of the DL RB is determined by the following equation:

$$n_{PRB}^{e\text{-}PHICH} = n_{PRB}^{PUSCH} \bmod m$$

wherein n is an index value, $n_{PRB}^{e\text{-}PHICH}$ is the index of the DL RB, $n_{PRB}^{PUSCH}$ is an index of a UL RB having a lowest RB index value among at least one UL RB, and m is an integer representing a number of DL RBs.

2. The method according to claim 1, wherein m is any one of the number of RBs contained in a given downlink bandwidth, and wherein m is a cell-specific parameter.

3. The method according to claim 1, wherein if the ACK/NACK response and another ACK/NACK response for a another UE are mapped to the same DL RB, the ACK/NACK response and the another ACK/NACK response are generated using different orthogonal sequences.

4. The method according to claim 3, wherein an index of an orthogonal sequence which is used for generating the ACK/NACK response is determined in consideration of $n_{PRB}^{PUSCH}$.

5. The method according to claim 3, wherein an index of an orthogonal sequence which is used for generating the ACK/NACK response is determined by the following equation, $$n_{e\text{-}PHICH}^{seq} = \lfloor n_{PRB}^{PUSCH}/m \rfloor$$

where $n_{e\text{-}PHICH}^{seq}$ is the index of the orthogonal sequence.

6. The method according to claim 1, wherein if the ACK/NACK response and another ACK/NACK response for another UE are mapped to the same DL RB, the ACK/NACK response and the another ACK/NACK response are generated using different resource elements (REs).

7. The method according to claim 1, wherein m is either the number of RBs allocated for DL data transmission to the UE or a UE-specific parameter.

8. The method according to claim 1, wherein m is the number of RBs attempted to be decoded for the UE configured to obtain control information.

9. The method according to claim 1, wherein:
the frequency domain location of the DL resources varies based on a group index, and
the group index is determined by the following equation:

$$n_{e\text{-}PHICH}^{group} = n_{PRB}^{PUSCH} \bmod l$$

where $n_{e\text{-}PHICH}^{group}$ is the group index, $n_{PRB}^{PUSCH}$ is an index of a UL RB having the lowest RB index among the at least one UL RB, and l is either the number of groups or a UE-specific parameter.

10. A method for receiving signals by a user equipment (UE) in a wireless communication system, comprising:
transmitting uplink (UL) data to a base station (BS); and
receiving an Acknowledgement/Negative Acknowledgement (ACK/NACK) response in response to the UL data on downlink (DL) resources,
wherein a time domain location of the DL resources is in a data region, which is a resource region, other than a control region indicated by a physical control format indicator channel (PCFICH), and
wherein a frequency domain location of the DL resources is represented by an index of a DL resource block (RB), and the index of the DL RB is determined by the following equation:

$$n_{PRB}^{e\text{-}PHICH} = n_{PRB}^{PUSCH} \bmod m$$

where n is an index value, $n_{PRB}^{e\text{-}PHICH}$ is the index of the DL RB, $n_{PRB}^{PUSCH}$ is an index of a UL RB having a lowest RB index value among at least one UL RB, and m is an integer representing a number of DL RBs.

11. A base station (BS) device for use in a wireless communication system comprising:
a transmission (Tx) module; and
a processor,
wherein the processor generates an Acknowledgement/Negative Acknowledgement (ACK/NACK) response in response to uplink (UL) data received from a user equipment (UE), and maps the ACK/NACK response to downlink (DL) resources and transmits the mapped ACK/NACK response,
wherein a time domain location of the DL resources is in a data region, which is a resource region, other than a control region indicated by a physical control format indicator channel (PCFICH), and
wherein a frequency domain location of the DL resources is represented by an index of a DL resource block (RB), and the index of the DL RB is determined by the following equation:

$$n_{PRB}^{e\text{-}PHICH} = n_{PRB}^{PUSCH} \bmod m$$

where n is an index value, $n_{PRB}^{e\text{-}PHICH}$ is the index of the DL RB, $n_{PRB}^{PUSCH}$ is an index of a UL RB having a lowest RB index value among at least one UL RB, and m is an integer representing a number of DL RBs.

12. A user equipment (UE) device for use in a wireless communication system comprising:
a reception (Rx) module; and
a processor,
wherein the processor receives an Acknowledgement/Negative Acknowledgement (ACK/NACK) response in response to a UL data transmitted to a base station (BS) on downlink (DL) resources,
wherein a time domain location of the DL resources is in a data region, which is a resource region, other than a control region indicated by a physical control format indicator channel (PCFICH), and
wherein a frequency domain location of the DL resources is represented by an index of a DL resource block (RB), and the index of the DL RB is determined by the following equation:

$$n_{PRB}^{e\text{-}PHICH} = n_{PRB}^{PUSCH} \bmod m$$

where n is an index value, $n_{PRB}^{e\text{-}PHICH}$ is the index of the DL RB, $n_{PRB}^{PUSCH}$ is an index of a UL RB having a lowest RB index value among the at least one UL RB, and m is an integer representing a number of DL RBs.

* * * * *